(12) United States Patent
Courbis

(10) Patent No.: US 7,887,260 B2
(45) Date of Patent: Feb. 15, 2011

(54) APPARATUS FOR POSITIONING AND DAMPING TUBES OR PIPELINES

(75) Inventor: Herve Courbis, Beaumont Monteux (FR)

(73) Assignee: Financiere de Beaumont-FDB, Romans (FR)

( * ) Notice: Subject to any disclaimer, the term of this patent is extended or adjusted under 35 U.S.C. 154(b) by 128 days.

(21) Appl. No.: 12/090,662

(22) PCT Filed: Oct. 6, 2006

(86) PCT No.: PCT/FR2006/050996

§ 371 (c)(1),
(2), (4) Date: Apr. 18, 2008

(87) PCT Pub. No.: WO2007/045783

PCT Pub. Date: Apr. 26, 2007

(65) Prior Publication Data

US 2008/0286052 A1    Nov. 20, 2008

(30) Foreign Application Priority Data

Oct. 18, 2005    (FR)    ................................... 05 53152

(51) Int. Cl.
*F16L 1/20* (2006.01)
(52) U.S. Cl. .................... 405/184.4; 405/212
(58) Field of Classification Search ............. 405/184.4, 405/211, 212, 215, 216; 114/219; 166/367
See application file for complete search history.

(56) References Cited

U.S. PATENT DOCUMENTS

| 3,541,800 | A | * | 11/1970 | Ford et al. | ................... 405/211 |
| 3,557,564 | A | | 1/1971 | Hauber | |
| 3,563,525 | A | * | 2/1971 | Narabu | ........................ 267/140 |
| 3,584,464 | A | * | 6/1971 | Saadeh et al. | ............... 405/215 |
| 3,593,531 | A | * | 7/1971 | Saadeh et al. | ............... 405/212 |
| 3,708,988 | A | * | 1/1973 | Miura | ........................ 405/215 |
| 3,948,500 | A | * | 4/1976 | Korbuly et al. | ............. 267/140 |
| 4,258,641 | A | * | 3/1981 | Wakamiya | .................. 114/219 |
| 4,355,792 | A | * | 10/1982 | Fukuda et al. | .............. 267/153 |

(Continued)

OTHER PUBLICATIONS

Patent Abstract of Japan, vol. 1999, No. 10, Aug. 31, 1999 & JP 11141747A (Ishikawajima Harima Heavy Ind Co Ltd), May 28, 1999.

(Continued)

*Primary Examiner*—Tara Mayo-Pinnock
(74) *Attorney, Agent, or Firm*—Heslin Rothenberg Farley & Mesiti, P.C.

(57) ABSTRACT

A device for maintaining very long tubes or pipelines in position and damping same in relation to fixed support structures is inserted between a pipeline and a fixed support which can be used to position a plurality of pipelines. The device includes a cylindrical sleeve comprising a central hub and side walls which project out externally, such that a pipeline can be passed through a central hole. An elastically-deformable shaped component is provided around the central hub and between the side walls of the sleeve in order to provide damping at least radially and to perform an elastic return function. The component deforms temporarily when it abuts against the fixed support in accordance with the movements of the pipeline owing to environmental stresses. The device controls and absorbs axial and radial movements following the positioning of the pipeline and the expansion thereof.

14 Claims, 4 Drawing Sheets

U.S. PATENT DOCUMENTS

| | | | |
|---|---|---|---|
| 4,363,567 A * | 12/1982 | Van der Graaf | 405/224.2 |
| 4,515,502 A * | 5/1985 | Kajigaya et al. | 405/215 |
| 4,880,088 A * | 11/1989 | De Oliveira | 188/377 |
| 6,270,387 B1 * | 8/2001 | Nesheim | 441/133 |
| 7,226,120 B2 * | 6/2007 | Yamazaki | 296/187.03 |
| 7,393,158 B2 * | 7/2008 | Caldwell et al. | 405/224.2 |
| 7,568,861 B2 * | 8/2009 | Godoy et al. | 405/211 |
| 2003/0021634 A1 * | 1/2003 | Munk et al. | 405/224.2 |
| 2003/0119390 A1 | 6/2003 | Riach et al. | |
| 2008/0131210 A1 * | 6/2008 | Wajnikonis | 405/211 |

OTHER PUBLICATIONS

International Search Report for PCT/FR2006/050996, dated Jan. 30, 2007.

\* cited by examiner

APPARATUS FOR POSITIONING AND DAMPING TUBES OR PIPELINES

CROSS REFERENCE TO RELATED APPLICATIONS

This application is a national stage filing under section 371 of International Application No. PCT/FR2006/050996, filed on Oct. 6, 2006, and published in French on Apr. 26, 2007, as WO 2007/045783 and claims priority of French application No. 0553152 filed on Oct. 18, 2005, the entire disclosure of these applications being hereby incorporated herein by reference.

BACKGROUND ART

The invention relates to the technical field of systems and means for controlling the position of pipes and similar objects in structures and installations, where the said pipes serve to convey fluids of all types.

The invention relates to and finds a particular application in the technical field of the petroleum industry, and specifically in the extraction of raw materials such as offshore oil.

The invention is based on a problem raised in the offshore oil industry, described below, but the solution to this problem, in addition to the application concerned, can find other applications in environmental situations involving stresses and loads of the same type.

With regard to the initial problem posed by deep offshore oil extraction, and also by installations using pipelines, it is necessary to secure the pipelines provided in bundles with regard to fixed structures which are either ground connections, or intermediate support connections. Depending on the environment in which the pipelines are present, and for example offshore, the installations are subjected to swell movements, currents of widely varying amplitude, landslides, and differential expansions between the materials according to the temperature. The bundling of pipelines from turret like support structures requires control of the position of each of the pipelines loaded by the above stresses, while preventing their damage. FIG. 1 thus schematically shows the use according to the prior art of a bundle of pipelines with spacer means placed at different depths, these pipelines being connected to a submerged buffer tank acting as a float, itself connected to the ship, the pipeline bundle being connected to the conventional drilling means. The depths for this type of installation are considerable, serving to extend up to 2000 meters. Mooring and stabilizing lines or cables provide for and control the positioning of the buffer tank and its sway, and thus also of the pipelines.

To secure the pipelines with regard to the turret support structures according to the prior art, complex mechanical means are used for clamping, with metal hoops and foam thermal insulation means.

The known solutions remain complex to produce, costly and impractical to install for assembly and disassembly, for performing maintenance operations.

The Applicant's approach was therefore to reflect and to seek another solution which perfectly meets the technical and environmental requirements, which is easy to install with regard to the maintenance problems, and which obviously contends with the pipeline expansion stresses.

The solution provided meets all these objectives and finds an immediate application in deep offshore oil production, and also more generally in controlling the position of tubes and pipelines for the distribution and for flow of fluids in other environmental situations.

The solution provided is advantageous in the simplicity of implementation and assembly, and in particular in situ during maintenance operations.

BRIEF SUMMARY OF INVENTION

According to a first feature of the invention, the device for maintaining in position and damping of very long tubes or pipelines in relation to fixed support structures is characterized in that the said device is inserted between a pipeline and a fixed support, the latter allowing the positioning of a plurality of pipelines, and in that each device comprises a cylindrical coupling having a central hub and externally projecting sides and allowing the passage of a pipeline through a central bore, the said coupling accommodating around its central hub and its sides, a profiled component having an elastic deformation capacity and providing at least radial damping and elastic return functions, the said component being temporarily deformed when it thrusts against the said fixed support, according to the induced movements of the pipeline according to the environmental stresses, the said device ensuring the control and absorption of the axial and radial movements due to the position of the pipeline and its expansion.

These features and others will clearly appear from the rest of the description.

BRIEF DESCRIPTION OF THE DRAWING FIGURES

To clarify the subject matter of the invention shown in a non-limiting manner in the figures of the drawings:

FIG. 6 is a partial view of the device assembled on a support structure capable of constituting a turret;

DETAILED DESCRIPTION

To make the subject matter of the invention more concrete, it is now described in a non-limiting manner illustrated in the figures of the drawings.

Figure 1:
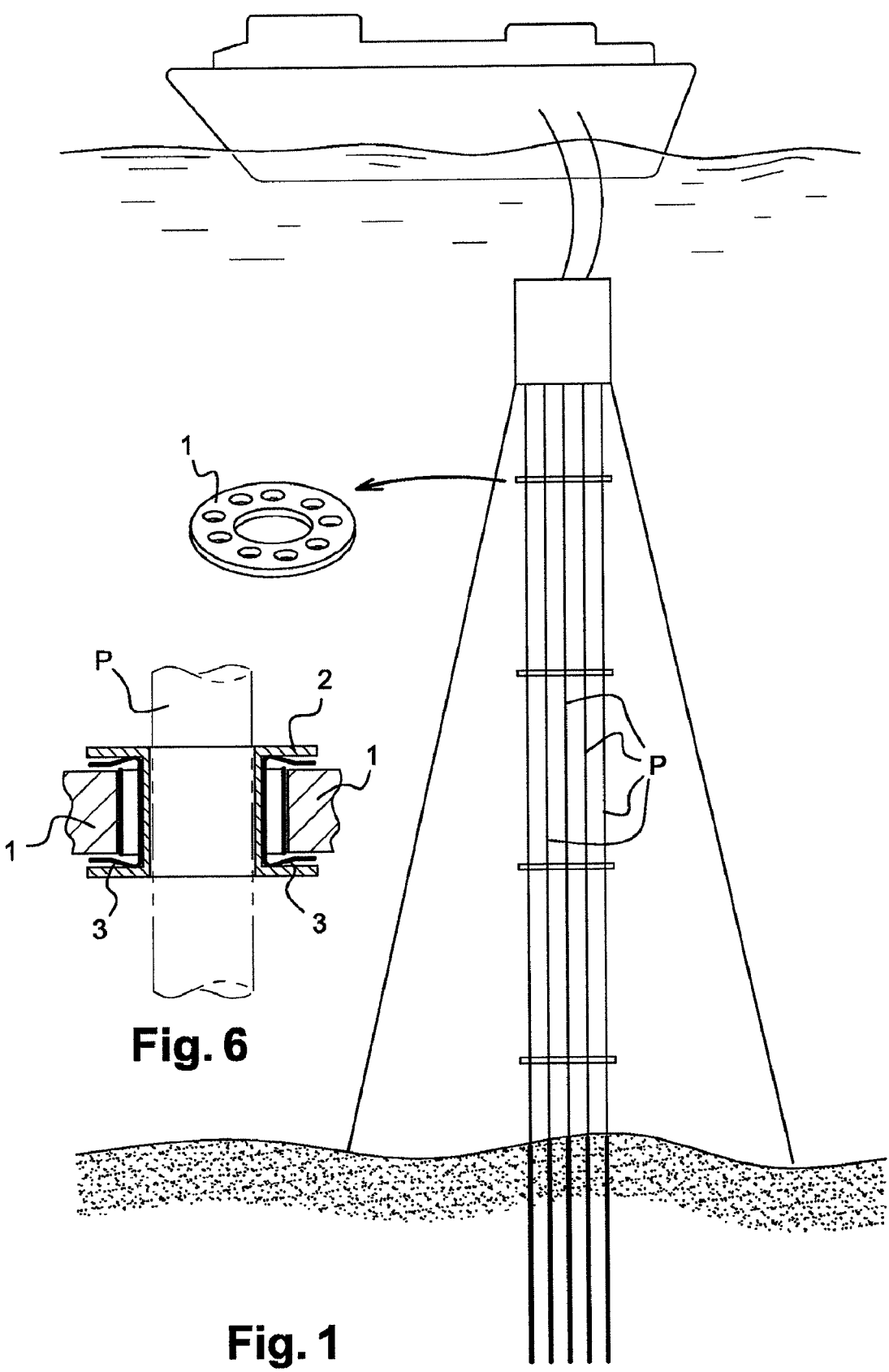
FIG. 1 is a schematic view showing the application of the device of the invention for securing a pipeline bundle in deep waters.
Figure 3:
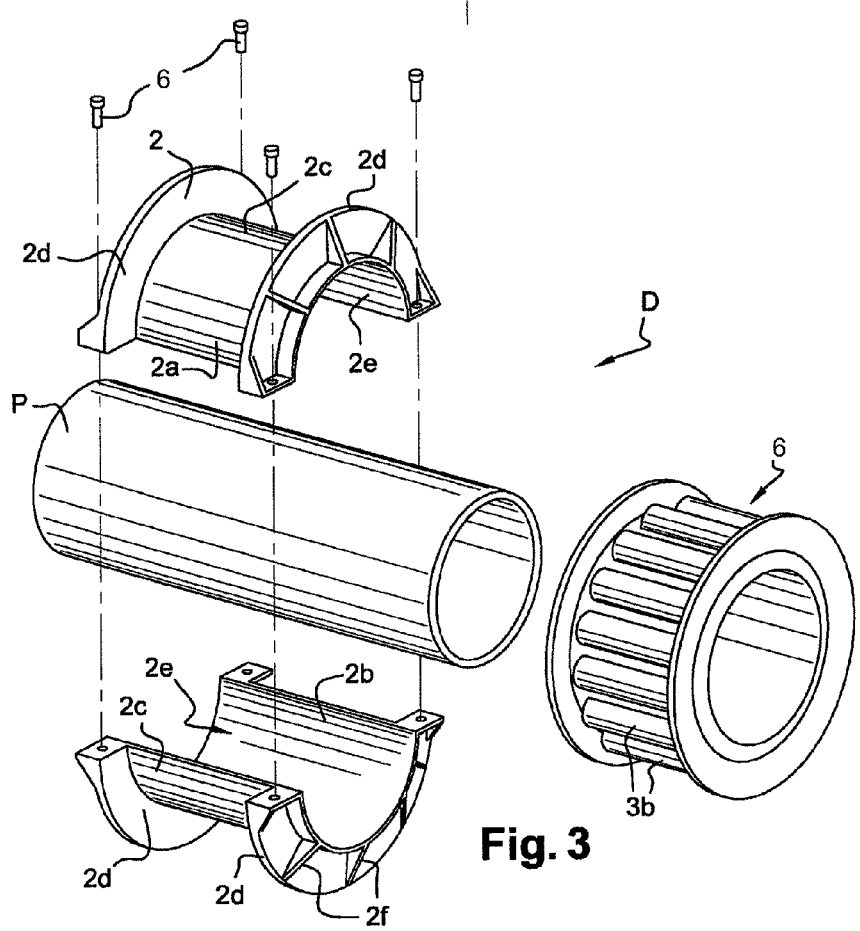
FIG. 3 is a view showing the device of the invention in a first embodiment, and before assembly.
Figure 4:
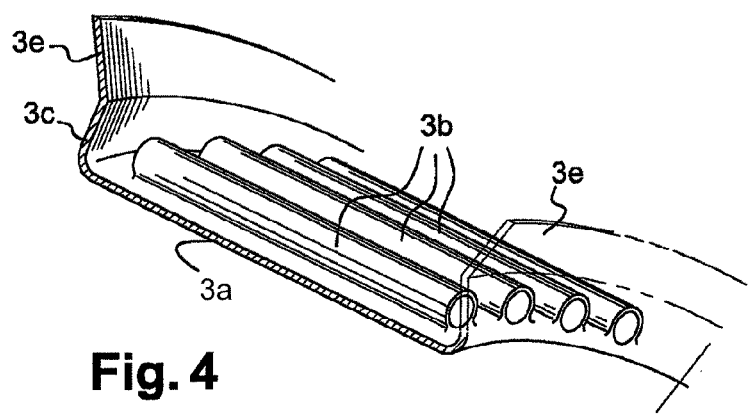
FIG. 4 is a partial view and longitudinal cross section of the device according to the invention after assembly.

The device for maintaining in position and damping of very long tubes is referenced as a whole by (D), and is shown before assembly in FIG. 3 on a pipeline (P) or tube. The device is intended for insertion between the pipeline and a fixed support (1) which may consist for example of a turret as shown in FIG. 1 for the centering and positioning of a plurality of pipelines assembled in a bundle. This fixed support (1) is arranged directly or with added means for defining openings for the passage of each pipeline and its associated device (D).

Figure 2:
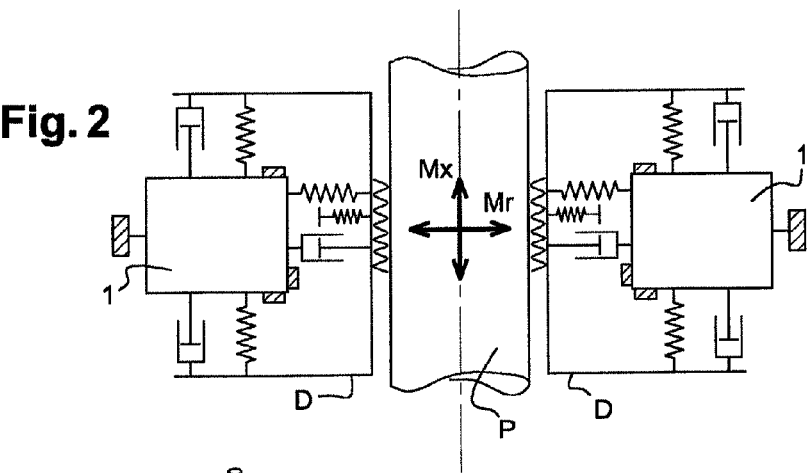
FIG. 2 is a schematic view showing the loads applied to the pipelines with regard to the fixed spacing and position control structures.

FIG. 2 of the drawings first schematically represents the various functions implemented by the device (D) of the invention with regard to the fixed parts and to the pipeline.

The following symbols have been used:
D: Device of the invention considered as a whole
P: Pipeline
1: Fixed structure
Mx: Axial movement
Mr: Radial movement

: Damping function

: Sliding function

: Spring function

The device (D) described below meets all these requirements.

Each device (D) for maintaining in position and damping of the pipelines consists of a cylindrical coupling (2) produced in two half-parts (2a-2b) which, after connection, are joined together by connecting means (6). Each coupling comprises a central hub (2c) and two lateral sides (2d) externally projecting and set back from the ends of the one-piece conformed hub, the assembly being produced from a rigid plastic. The coupling has an internally smooth inside bore (2e) which has a substantially higher diameter than the diameter of the pipeline passing through. The said sides (2d) form rings and may be arranged externally with stiffening ribs (2f). The connecting means are of all known and appropriate types such as bolting. It is therefore understandable that the coupling is easily installed around the corresponding part of the pipeline. The device complementarily comprises at least one additional profiled component (3) performing a damping function, or two components (3-4) according to the configuration selected.

Figure 5:
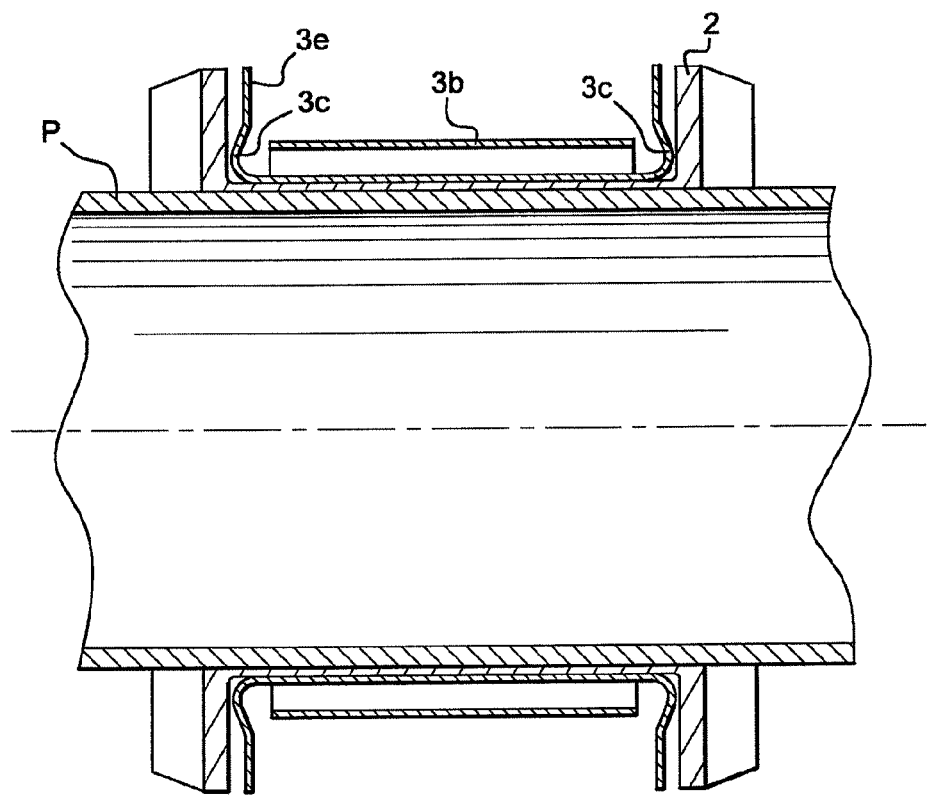
FIG. 5 is a partial view and cross section showing the damping means included in the device in one embodiment of the invention.
Figure 7:
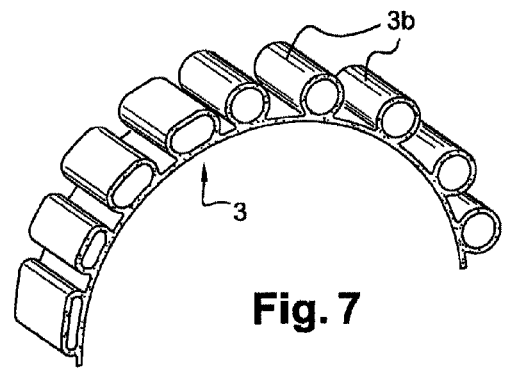
FIG. 7 is a partial view of the damping means of the invention arranged with a configuration of a plurality of transverse damping rounds with a simulation of the deformation of the strips in different configurations.
Figure 8:
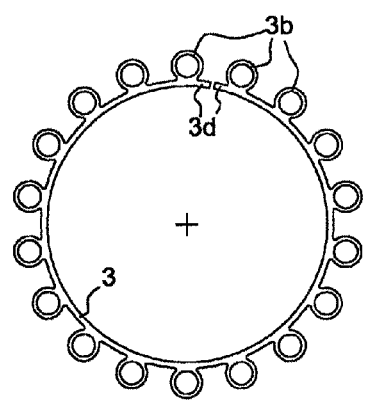
FIGS. 8 and 9 are views showing two alternative embodiments of the damping means incorporating transverse strips having a different profile.
Figure 9:
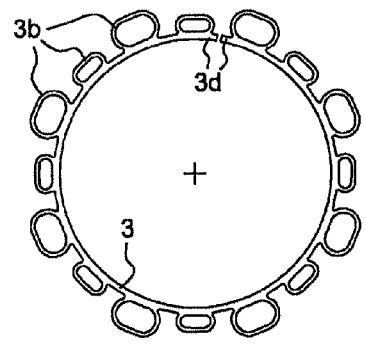

The component (3) performing a damping function is designed and produced in the form of a ring placed around the hub of the coupling and opposite its internal lateral sides. This ring is itself arranged with a base (3a) accommodating means for damping at least part of the transverse damping means and, if applicable, lateral damping means (3c). This ring according to the invention surrounds the hub of the coupling in the service condition, and it is prepared from an elastomer with elastic deformation memory and more particularly the elastomer known by the registered trademark "Courbhane". This ring is transversally split, that is it is capable of opening to be introduced around the hub of the coupling, and of "closing", that is with its ends (3d) touching, after placement. This ring is thus centered around the hub of the coupling, and, along each of its peripheral edges, has return walls (3e) facing the corresponding inside walls of the coupling. According to the invention, the ring, along its whole developed length and transversally, has a plurality of damping means in the form of one-piece conformed sausage-shaped strips (3b), with an elastic capacity for deformation by compression. These transverse strips have identical or different cross sections, identical or different thicknesses, to thereby allow the absorption of compression loads identically or differently. Advantageously, the length of the strips is such that it is lower than the width of the ring between its walls (3e) for permitting good deformability. These strips (3b) thus have a capacity of deformation in the radial direction of the ring. Other damping means are used and may either be included in the configuration of the ring (3), or outside it. In the first case shown in FIGS. 5 and 6 in particular, the walls or lateral sides (3c) of the ring are arranged with junction and overlapping margins (3c) or projecting externally in order to be centered and to bear against the opposite sides (2d) of the coupling. The said margins (3c) thus conformed provide an additional damping function by elastic deformation when loaded in an axial plane.

Figure 10:
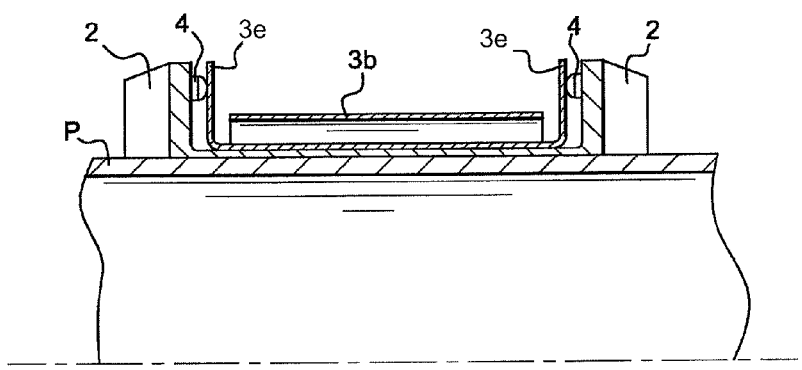
FIG. 10 is a view of an alternative embodiment of the holding device according to the invention.

As an alternative, as shown in FIG. 10, the lateral sides (3e) of the ring are straight and perpendicular to the base of the ring. In this case, the axial damping is provided by deformable elastomer studs (4) placed on and fastened to the insides of the coupling walls in any appropriate manner.

The device according to the invention is of simple design, easy to implement and has great operating flexibility. The technical features of the ring can be adjusted according to the applications of the device. The cross sections of the margins are variable, if necessary to allow a gradual decrease or increase in the damping loads.

The said strips are presented in a transverse position with regard to the development of the ring, but they may be positioned differently obliquely, or be conformed in a herringbone pattern or be distributed differently.

The device is thus assembled between the pipeline and the fixed structure. Thus, it is the fixed structure which bears against the damping parts of the ring. The device is therefore somehow suspended and floating between the pipeline and the fixed structure while absorbing all the loads of the environment. Due to the smooth bore of the coupling, the device allows the axial sway of the pipeline, its radial sway by the existing clearance, and by absorbing the expansions of the pipelines, due to variations in the temperature of the surrounding environment and of the fluids transported.

Without going beyond the scope of the invention, the damping strips and/or studs may be solid or hollow. The said strips and/or studs and/or lips thus provide damping and spring functions by the effect of compression and elastic relaxation.

The floating arrangement of the devices (D) on the fixed structure, while being centered and controlled while bearing on the transverse sides, offers extreme adaptability of the devices. Replacement during maintenance is easy, and can be done in any place and particularly in situ.

Pipelines which are bundled from a plurality of fixed superimposed structures are perfectly but not rigidly secured. Connecting means, not shown, between the various devices assembled on a fixed structure, are provided if necessary, while permitting rapid assembly/startup.

The invention perfectly meets the needs identified in the context of pipelines for the deep offshore oil industry, but all other applications are feasible in the context of meeting external requirements of the same type.

The invention claimed is:
1. An apparatus for maintaining tubes or pipelines in position and damping the tubes or pipelines in relation to fixed support structures, comprising a fixed support having multiple openings receiving and positioning a plurality of tubes or pipelines, and a device inserted between a tube or pipeline and the fixed support, wherein the device comprises a cylindrical coupling having a central hub and externally projecting sidewalls and allowing passage of the tube or pipeline through a central bore of the hub, the coupling having around its central hub and between its side walls, a profiled component having an elastic deformation capacity and providing at least axial damping and radial damping and elastic return functions for the tube or pipeline, the component being temporarily deformed when thrust against the fixed support, according to induced movements of the tube or pipeline due to environ- mental stresses, the device ensuring control and absorption of axial and radial movements due to position of the tube or pipeline and tube or pipeline expansion, wherein the profiled component comprises a ring placed around the hub of the coupling and opposite the side walls, the ring having return walls along peripheral edges of the ring, the return walls facing and cooperating with corresponding inside surfaces of the side walls of the coupling to provide the axial damping.

2. The apparatus according to claim 1, wherein the cylindrical coupling is assembled from two half-parts which, after connection, are joined together by connecting means, the externally projecting sidewalls of the cylindrical coupling are set back from ends of the assembled coupling, the coupling comprises a plastic, and the coupling has an inside bore which has a substantially larger diameter than a diameter of the tube or pipeline passing through the central bore.

3. The apparatus according to claim 2, wherein said side walls form rings.

4. The apparatus according to claim 3, wherein the side walls are provided externally with stiffening ribs.

5. The apparatus according to claim 1, wherein the ring comprises lateral damping means.

6. The apparatus according to claim 1, wherein the ring comprises an elastomer with elastic deformation memory.

7. The apparatus according to claim 1, wherein the ring is transversally split to facilitate opening to be introduced around the hub of the coupling, and closing, with ring ends touching, after placement.

8. The apparatus according to claim 1, wherein the ring, along its whole length and transversally, has a plurality of damping means with an elastic capacity for deformation.

9. The apparatus according to claim 8, wherein a length of the damping means is smaller than a width of the ring for permitting deformability, and the damping means are adapted for deformation in a radial direction of the ring.

10. The apparatus according to claim 1, wherein the ring comprises supplementary damping means on lateral sides of the ring, with junction and overlapping margins or projecting externally in order to be centered and to bear against opposite sidewalls of the coupling, and said margins provide the axial damping by elastic deformation when loaded in an axial plane.

11. The apparatus according to claim 1, wherein the return walls of the ring are straight and perpendicular to a base of the ring, and the axial damping is provided by deformable elastomer studs placed and fastened to inside surfaces of the side walls.

12. The apparatus according to claim 1, in combination with a plurality of offshore pipelines, each pipeline extending through a respective different opening of the multiple openings of the fixed support with the device inserted between each pipeline and the support in the respective opening.

13. Installation for maintaining in position and damping a plurality of offshore pipelines, comprising the apparatus of claim 12 in combination with at least one additional axially spaced apart fixed support having multiple openings, each opening of the at least one additional fixed support receiving a respective pipeline and a respective device.

14. The apparatus according to claim 1, wherein the fixed support comprises a turret.

* * * * *